Sept. 12, 1961 G. HERZOG ET AL 2,999,936
RADIATION WELL LOGGING
Filed Dec. 6, 1957
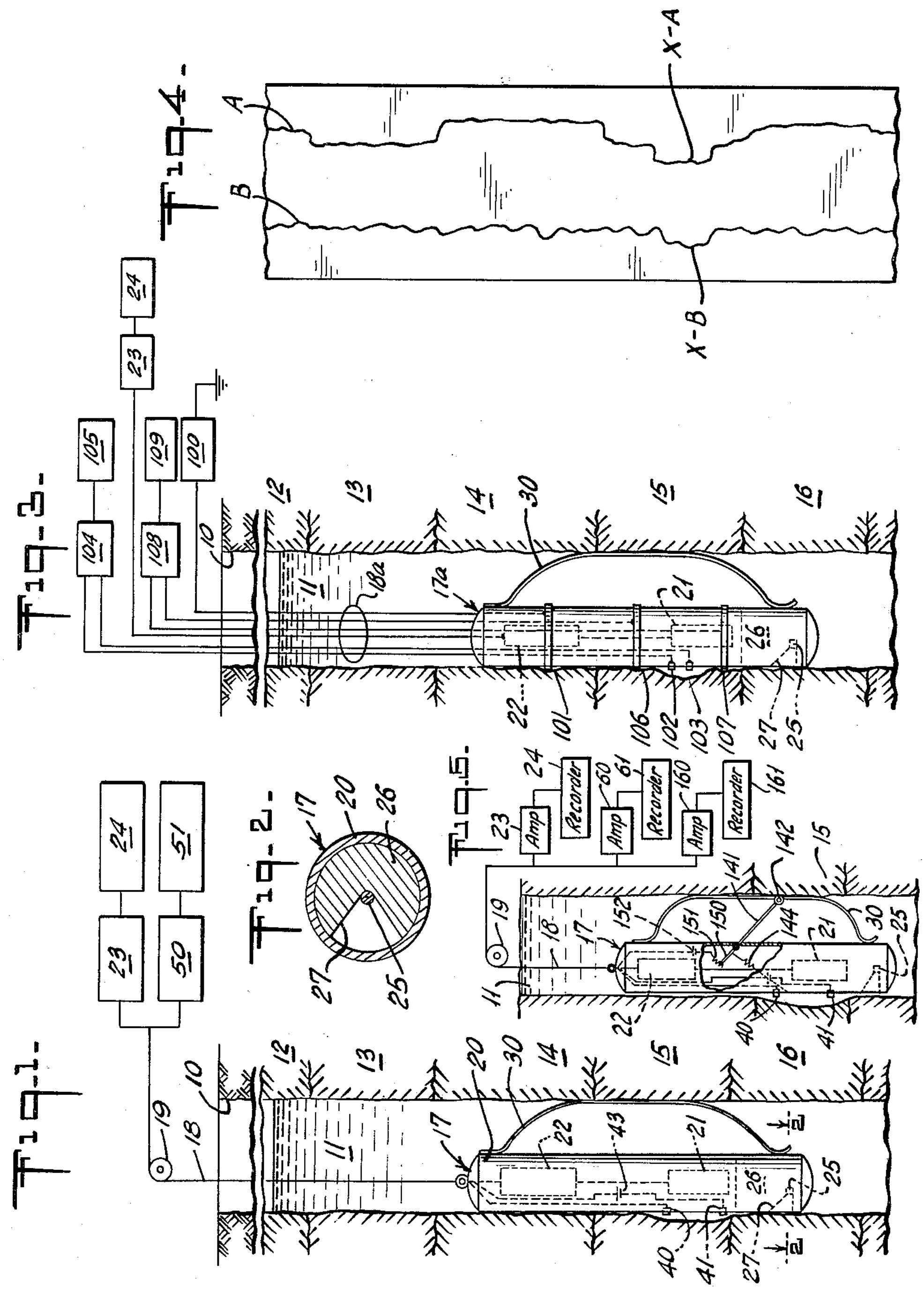

United States Patent Office 2,999,936

Patented Sept. 12, 1961

1

2,999,936

RADIATION WELL LOGGING

Gerhard Herzog and George M. Wood, Houston, Tex., assignors to Texaco Inc., a corporation of Delaware Filed Dec. 6, 1957, Ser. No. 701,085

9 Claims. (Cl. 250—83.3)

The present invention relates generally to the logging of bore holes or wells through the earth by means of radioactivity analysis techniques. More particularly, the invention relates to improvements in radioactivity well logging involving the passage of a source of radiation and a radiation detector through the bore hole in order to provide information as to the nature of the earth formations traversed thereby.

Various kinds of radioactivity well logging are employed in geophysical prospecting. One kind of radioactivity well logging is natural gamma ray logging wherein a radiation detector is passed through the bore hole to measure the natural radiations emitted from the formations. Other forms of radiation well logging include gamma-gamma well logging, neutron-neutron well logging and neutron-gamma well logging. In accord ance with the three last-mentioned types of log, a source of primary radiation, either neutrons or gamma rays, is passed through the bore hole in order to induce therein secondary radiation, which may comprise neutrons, gamma rays or both. The secondary radiation is detected and measured as an indication of certain characteristics of the formation.

In the various types of radioactivity well logging, the position of the logging instrument in the bore hole and variations in the size of the bore hole along its length tend to interfere with the logging measurement in an adverse manner. These factors are particularly important in the cases where a source of primary radiation is employed to induce secondary radiations in the formation. The presence of well fluid ordinarily comprising hydrogenous material in the bore hole, tends to add to the problem, especially where neutrons are involved in the log. Various attempts have been made in the past to overcome these problems. For example, it has been proposed to decentralize the logging instrument by maintaining it against the side of the well bore by the use of resilient means, such as a bow spring in order to maintain the instrument a fixed distance from the formations being logged and to displace the well fluid between the logging instrument and the formation. Such a technique is shown for example in U.S. Patent No. 2,369,372—Hare, granted February 20, 1945. It has been further proposed in the past to make a caliper measurement of the bore hole size, simultaneously with the radioactivity well log in order to provide information as to the size of the bore hole and quantity of well fluid present in the well from place to place in order that this may be taken into account in the interpretation of the radioactivity well log. The aforementioned Hare patent also shows this approach to the problem. U.S. Patent No. 2,761,977—McKay, granted September 4, 1956, also discloses the calipering of a well bore simultaneously with a radioactivity well log.

The aforementioned prior art techniques provide useful information in overcoming the problems associated with variations in bore size and the presence of well fluid on a radioactivity well log. However, the teachings of these patents do not completely overcome these problems. In accordance with these prior art teachings, variations in distance between the logging instrument and the side of the bore hole are minimized and major variations in the size of the bore hole from place to place are taken into account. By pressing the logging instrument against the side of the bore hole during the course of the well log, it is possible to minimize the effect of variations in the size and shape of the bore hole which extend over comparatively long portions of the well bore as compared with the length of the logging instrument since the sensitive volume of the sonde remains a fixed distance from the side of the bore hole. However, it will be seen that variations in the side of the bore hole, even those of comparatively small depth, which are relatively short as compared with the length of the instrument, will result in variations in distance between the side of the instrument and the formation since the instrument will tend to ride along the high spots on the side of the formation, even when continuously urged thereagainst by a device such as a bow spring. It will be appreciated that the effect of such minor variations of short length as compared with the length of the logging instrument becomes of significant importance when it is realized that the usual logging instrument is ordinarily many feet in length, usually upwards of 10–15 feet, and that the effective sensitive length of the radiation detector itself is ordinarily much shorter than the total length of the instrument. The sensitive length of the detector is usually of the order of one foot in length and may quite frequently be of the order of 3 or 4 inches in length, especially in the case of a scintillation type detector. Accordingly, it will be appreciated that the aforementioned prior art techniques are deficient in that they do not account for minor variations in distance between the sensitive face of the logging instrument and the side of the bore hole due to variations in mud cake thickness and variations in bore hole diameter due to cracks, wash-out, or other flaws, which may be of the order of an inch or so to approximately a foot in length along the bore hole and which often is as small as an inch or less in depth. These minor variations are particularly important within the first inch of separation between the logging instrument and the side of the bore hole, especially in the case of a neutron log. Hence, this is an important factor when the logging instrument is resiliently maintained against the side of the bore hole.

Accordingly, it is an object of the present invention to provide improvements in radioactivity logging techniques which overcome difficulties due to the presence of relatively small flaws or openings along the bore hole.

It is a further object of the present invention to provide an improved radioactivity logging instrument including means for correcting variations in a log due to small variations in the contour of a well bore.

It is another object of the present invention to provide improvements in radioactivity well logging for overcoming adverse effects due to variations in distance between the logging instrument and the side of the bore hole.

It is still a further object to accomplish the preceding objects in a manner that does not interfere with the radioactivity log.

Briefly stated, in accordance with the present invention, a vertically elongated radiation logging instrument is passed through a bore hole, and, while being continuously urged toward one side of the bore hole, primary radiation is emitted from the instrument to bombard the formation and secondary radiation resulting from said primary radiation is detected in a zone whose vertical dimension is a minor fraction of the length of the elongated instrument. Simultaneously the electrical resistance between two spaced points along the sensitive face of the instrument adjacent the formation is measured in order to detect minor variations in the distance between the sensitive face of the instrument and the formation due to minor flaws, cracks or other variations in the configuration of the formation defining the side of the bore hole opposite the sensitive face of the instrument. A signal proportional to the detected radiation and a signal proportional to the distance between the sensitive face of the instrument and the formation as determined by said resistance measurement are recorded in correlation with the depth of the instrument in the bore hole.

A novel radioactivity logging instrument in accordance with the invention comprises an elongated housing for supporting a source of penetrative radiation and a detector of secondary radiation spaced from one another along the longitudinal axis of the instrument. Resilient means are provided for continuously urging the instrument against one side of a bore hole. On the side of the instrument that is urged toward the side of the bore hole, there is provided a caliper system including electrodes for measuring the electrical resistivity of the well fluid between the sensitive face of the instrument and the side of the bore hole in order to detect and measure the slight irregularities in the side of the bore hole.

For additional objects and advantages, and for a better understanding of the invention, attention is now directed to the following description and accompanying drawing. The features of the invention which are believed to be novel are particularly pointed out in the appended claims.

Referring to the drawing:

FIGURE 1 is a vertical-sectional elevation through a bore hole traversing a plurality of earth formations and having suspended therein a radioactivity logging instrument embodying principles of the invention;

FIGURE 2 is a cross-sectional view of a portion of a well logging instrument taken through the line 2—2 of FIGURE 1;

FIGURE 3 is a vertical-sectional elevation through an earth bore hole like that of FIGURE 1 which has suspended therein a radioactivity logging instrument embodying further features of the invention;

FIGURE 4 illustrates a logging record in accordance with the invention; and

FIGURE 5 is a vertical-sectional elevation illustrating a modified form of radioactivity logging instrument similar to that of FIGURE 1, and which embodies a further aspect of the invention.

Referring now to FIGURE 1, there is shown a bore hole 10 containing bore hole fluid 11 and which traverses a series of earth formations 12, 13, 14, 15, and 16. Within the bore hole 10 there is shown a logging instrument 17 suspended therein as by means of a cable 18, which may also provide means for electrically coupling the instrument 16 to electrical apparatus at the surface of the earth. A measuring device 19 is illustrated diagrammatically in contact with the cable 18 for determining the length of the cable 18 lowered into the bore hole 10 throughout a logging operation as an indication of the position of the instrument 17 in the bore hole 10.

The instrument 17 comprises an elongated housing or capsule 20 formed in accordance with known techniques of stainless steel or the like in order to withstand the conditions of pressure and temperature ordinarily encountered in a bore hole through the surface of the earth. Within the housing 20, there is provided a radiation detector 21 having an effective sensitive length along the longitudinal axis of the instrument 17 that may be of the order of a few inches to approximately one foot, and which represents a minor fraction of the total length of the instrument 17. For example, the detector 21 may be a Geiger-Müller type detector, such as the multiple cathode plate detector, or it may comprise a highly sensitive scintillation detector having a luminophor suitable for detecting radiation in accordance with the type of log to be made. Also within the housing 20 above the detector 21, there is provided a preamplifier 22 for enhancing the electrical output of the detector 21. The output of the preamplifier 22 is coupled through the cable 18 to an amplifier 23 and then to a recorder 24 for providing a graphic display of the logging signal in correlation with the position of the instrument 17 in the bore hole 10.

Within the housing 20, below the detector 21 and spaced therefrom a predetermined distance, there is provided a suitable radiation source 25, as determined by the type of radioactivity log to be conducted. The source 25 is mounted within an appropriate shielding member 26 having a radiation permeable aperture 27 for directing the radiation outwardly into the formation to be logged. The shielding member 26 is formed of appropriate material in accordance with known principles to prevent radiation(s) emitted by the source from passing directly to the detector 21. For example, the shield 26 may be formed of lead or tungsten to shield against gamma rays. to shield against neutrons, the shield may comprise a moderator together with an appropriate neutron capturing material, such as cadmium or boron. A combination of these or other materials may be employed to shield against neutrons, gamma rays, or a combination thereof in accordance with well-known principles. Advantageously, the aperture 27 in the shield 26 is generally of pie-shaped configuration, as shown in FIGURE 2.

Resilient pressure means, shown in the form of a bow spring 30, are affixed to one side of the instrument 17 for continually urging the instrument 17 against one side of the bore hole 10. The bow spring 30 is affixed to the instrument 17 in such manner that one or both ends thereof are in slidable engagement with the instrument 17 so that the spring 30 is free to flex along the axis of the instrument 17 in order to permit the instrument 17 to pass through areas of the bore hole 10 of different diameter without binding, which might cause the instrument 17 to become wedged therein. By thus maintaining the instrument 17 against one side of the bore hole 10 through the use of the bow spring 30, the sensitive face or side of the instrument, i.e., the side toward which the radiation permeable portion of the shield 26 is directed, is maintained in close proximity to the adjacent earth formations with a minimum of bore hole space, therefore a minimum of bore hole fluid 11, being interposed between the detector 21 and the formation being logged as well as between the source 25 and the formation being logged.

In order to account for minor variations in the configuration of the bore hole 10 opposite the sensitive side of the instrument 17, there is provided means for sensing slight variations in the configuration of the formation defining the sides of the bore hole 10 opposite the instrument 17 in the logging zone. More particularly, means are provided for measuring the electrical resistivity between spaced positions along the sensitive face of the logging instrument 17. These means include a pair of spaced electrodes 40, 41, shown in the form of button electrodes positioned on the outside of the housing 20 so as to be accessible to the well fluid 11 and adjacent earth formation being logged. The electrodes 40, 41 are employed to measure the resistivity in the zone between them and are shown connected in series with a battery 43, and thence over the cable 18 to a meter 50, thence to a recorder 51. It is to be understood that the meter 50 may include appropriate amplifying circuitry when that is desirable from a signal transmission standpoint. It is also to be understood that the battery 43 is likewise a schematic representation and that additional circuitry in the logging instrument 17 may be employed where desirable in accordance with known principles in the electric logging art. The electrodes 40, 41 are located on the instrument 17 opposite the radiation detector 21 in the logging zone. The distance between the respective electrodes should be no greater than the effective sensitive length of the detector 21 in order to assure definition commensurate with the need for detecting minor variations in the face of the bore hole opposite the sensitive face of the detector 21.

The resistivity between the electrodes 40, 41 depends upon the electrical characteristics of the intervening circuit path. This path includes well fluid and to some extent the adjacent earth formation. In regions where the earth formation adjoining a sensitive face of the instrument is relatively smooth, the quantity of well fluid between the two electrodes will be at a minimum; hence, the formation resistivity will be a greater factor than in the case where the formation is washed-out between the two electrodes. In the latter case, the well fluid will constitute a greater factor in determining the resistivity between the two electrodes. Thus, for a formation of given resistivity and for a well fluid of given resistivity, and assuming that the resistivity of the well fluid and the formation differ, the measured resistivity between the two electrodes will vary in accordance with variations in the configuration of the side of the bore hole.

The spacing of the two electrodes affects their relative sensitivity to formation resistivity and to well fluid resistivity. A longer spacing between the electrodes makes the resistivity measurement more sensitive to formation resistivity than to well fluid resistivity. Conversely, a shorter spacing between the electrodes makes the system more sensitive to the well fluid and less sensitive to the formation resistivity.

The utility of the resistivity measurement made in accordance with the present invention will be greatly increased through proper calibration prior to use. Utility of the resistivity measurement is further increased through knowledge of the approximate resistivities of the earth formation and of the well fluid in the generad area. Samples of the well fluid may be taken in order to provide additional information for calibration purposes.

In order to afford an improved log in accordance with the invention, it is further contemplated to make two separate resistivity measurements between electrodes having different spacings in order to make separate measurements, one of which is influenced primarily by the bore hole fluid, and the other of which is influenced primarily by the adjacent earth formation. Apparatus for carrying out this aspect of the invention is illustrated in FIGURE 3.

Referring now to FIGURE 3, there is shown a logging instrument 17*a* generally like the instrument 17 of FIGURE 1, but whch incorporates further features of the invention as hereinafter described in detail. Identical items in FIGURES 1 and 3 bear the same reference numeral.

The instrument 17*a* includes a radiation dectector 21 and preamplifier 22 like those shown in FIGURE 1. The source 25 and shield 26 are also like those shown in FIGURE 1. The output of the preamplifier 22 is transmitted over a cable 18*a*, generally like the cable 18 of FIGURE 1, but which may contain additional signal transmission paths. Although not specifically illustrated, it is to be understood that, as in the case of the system of FIGURE 1, means are provided for measuring the length of cable extending into the bore hole, and thus to determine the position of the logging instrument in the hole. At the surface of the earth, there is provided an amplifier 23 and a recorder 24 as in the case of the apparatus of FIGURE 1.

There is provided at the surface of the earth a power source 100 shown diagrammatically having one terminal connected to a ground potential and the other terminal coupled over the cable 18*a* to an electrode 101 in the form of a ring positioned on the outside of the logging instrument 17*a*. It is to be understood that the electrode 101 is insulated from the casing 20 of the instrument 17*a*. The power source 100 and current electrode 101 provide means for emitting an electric current into the well fluid 11 and earth formation surrounding the instrument 17*a* in order to develop an electric field. Positioned on the sensitive face of the instrument 17*a* in insulating relationship with the housing 20 and opposite the detector 21, there is shown a pair of button electrodes 102, 103. These electrodes are exposed to contact with the well fluid 11 and are electrically coupled over the cable 18*a* to a meter 104 at the surface of the earth. The output of the meter 104 is shown coupled to a recorder 105. Affixed to the housing 20 in insulating relationshp therefrom, there is also provided a pair of electrodes 106, 107 spaced from one another a substantially greater distance than the button electrodes 102, 103. The electrodes 106, 107 are shown in the form of rings circling the housing 20 opposite the respective ends of the detector 21 and are spaced from one another so as to be primarily sensitive to the resistivity of the nearby earth formation. The electrodes 106, 107 are electrically coupled over the cable 18*a* to a meter 108 having its output coupled to a recorder 109.

Preferably, the spacing of the button electrodes 102, 103 should be of the order of the smallest variation or flaw to be detected in the face of the formation opposite the sensitive face of the instrument 17*a*. The spacing between the two ring electrodes 106, 107 should be as great or greater than the vertical dimension of the largest flaw or wash-out in the face of the formation that normally should be accounted for in accordance with the present invention. It is desirable to obtain the resistivity of the bore hole fluid as affected by variations in the cross-sectional area of the conductive path between them. Thus, the button electrodes should not be too closely spaced from one another, otherwise they will indicate the specific resistivity of the fluid without being markedly affected by changes in the cross-sectional area of the fluid and which are due to variations in the formation adjacent the sensitive face of the detector. It has been found that the spacing of the button electrodes should be of the order of six (6) inches or less and that the spacing of the ring electrodes should be slightly greater than that of the button electrodes. By way of example, the spacing between the button electrodes may be about 2 inches and the spacing between the ring electrodes about four (4) to six (6) inches.

It is further contemplated in accordance with the invention to combine the outputs of the button electrodes 102, 103 and the ring electrodes 106, 107 in opposed relationship in such manner that the effect of the formation upon the measurement made with the short spaced electrodes 102, 103 is cancelled out of the resulting electric signal. As determined by the specific conditions encountered, this may require that different proportions of the two signals be applied to affect cancellation of the formation resistivity upon the measurement made by the short spaced electrodes. This may be readily accomplished by deriving the desired percentage of the two signals from appropriate voltage dividers and inverting the polarity of one of the two signals prior to combining them across a common impedance element in order to provide a resultant signal wherein formation resistivity has no effect on the resultant signal.

Referring now to FIGURE 4, there is shown a graphic display illustrating how the information obtained in accordance with the present invention may be employed to interpret a radioactivity well log. In the right-hand column of the chart there is shown a log A representing a signal showing variations in porosity as determined by a gamma-gamma logging instrument with zones of greater porosity being indicated as the trace tends toward the left as shown in the drawing. Plotted to the left of the line A, there is shown a line B derived in accordance with the present invention and which shows variations in the side of the bore hole within the sensitive zone of the detector throughout the log. An interpretation of the graph A might indicate a region of very high porosity at X—A and without additional information this might lead to an incorrect conclusion with respect to the formation represented by this portion of the graph. However, by reference to the portion X—B of the graph B corresponding to the region of the formation indicated at X—A, it will be noted that a wash-out occurred in this portion of the formation and which explains that the log indication at X—A is not necessarily a region of high porosity. Although increasing porosity is shown as an excursion to the left in FIGURE 4, it is noted that this direction has been chosen for purposes of illustration only. Obviously increasing porosity may be shown as an excursion to the right as in the case of the usual commercial porosity log.

In the case of a neutron-type log, either neutron-neutron or neutron-gamma ray, it is contemplated that an additional caliper log may advantageously be conducted on the back side of the logging instrument, i.e., the side remote from the sensitive face of the logging instrument, concurrently with the determination of minor variations in the configuration of the formation adjacent to the sensitive face of the detector. The additional caliper log is employed to determine variations in the overall size of the bore hole, as opposed to the specific information as to minor variations obtained in accordance with the features of the invention as set forth above.

The additional or overall caliper log may be carried out through the instrumentality of an additional probe member for sensing major variations in the size of the bore hole and may comprise apparatus such as that illustrated in FIGURES 1–3.

Referring particularly to FIGURE 5, there is shown an apparatus similar to that of FIGURE 1 wherein an additional caliper device comprises a feeler arm 141 including a probe member 142 that is resiliently urged outwardly from the instrument 17 to contact the inner side of the bow spring 30, which, in turn, rides against the side of the bore hole. The feeler arm 141 is shown pivotally mounted to the housing 20 about an axis 143. A tension spring 144 is connected between one end of the arm 141 and the housing 20 to maintain the probe 142 resiliently urged against the inner side of the bow spring 30. The position of the probe 142 is converted into an electrical signal which is transmitted to the surface along with the other signal information. This may be accomplished by employing the end of the arm 141 remote from the probe 142 to control the position of a wiper contact 150 on an electrical impedance element shown as a variable resistor 151. The resistor 151 is connected in circuit with a battery 152 to provide an electrical signal which varies in acordance with the position of the probe 142. The electrical signal indicative of the position of the probe 142 is transmitted over the cable 18 to the surface of the earth. At the surface this signal is applied to an amplifier 160 which in turn is coupled to a recorder 161 for providing a continuous display indicative of major variations in the size of the bore hole.

It is to be understood that the position of the probe 142 may be converted to an electric signal in accordance with other circuit arrangements. For example, the probe may control the position of an electrical wiper that contacts a resistance element connected across the terminals of a battery or other source of electricity, rather than the series circuit arrangement illustrated in FIGURE 5.

Obviously, many modifications and variations of the invention, as hereinbefore set forth, may be made without departing from the spirit and scope thereof, and therefore only such limitations should be imposed as are indicated in the appended claims.

We claim:

1. The method of logging an earth formation traversed by a bore hole which comprises passing a vertically elongated radiation logging instrument through the bore hole while continuously urging said instrument toward one side of the bore hole in order to direct a sensitive face of the instrument against an adjacent formation, making a penetrative radiation log primarily indicative of a characteristic of the composition of the earth formations by bombarding an earth formation adjacent the bore hole with primary radiation emitted from a source carried by said instrument and detecting secondary radiation resulting from said primary radiation in a zone whose vertical dimension is a minor fraction of the length of the elongated instrument along its major axis, determining the condition of the wall of the bore hole by passing an electric current through a zone adjacent said sensitive face of the instrument and measuring the electrical resistivity between spaced positions along the sensitive face of the instrument in order to detect minor variations in the configuration of the formation defining the side of the bore hole adjacent said sensitive face of the instrument, recording a signal proportional to the detected radiation in correlation with the depth of the instrument in the bore hole, and recording a signal proportional to the electrical resistivity between said positions as an indication of the configuration of the formation adjacent said sensitive face of the instrument in correlation with the depth of the instrument in the bore hole.

2. The method of logging an earth formation traversed by a bore hole which comprises passing a vertically elongated radiation logging instrument through the bore hole while continuously urging said instrument toward one side of the bore hole in order to direct a sensitive face of the instrument against an adjacent formation, making a penetrative radiation log primarily indicative of a characteristic of the composition of the earth formations by bombarding an earth formation adjacent the bore hole with primary radiation emitted from a source carried by said instrument and detecting secondary radiation resulting from said primary radiation in a zone whose vertical dimension is a minor fraction of the length of the elongated instrument along its major axis, determining the condition of the wall of the bore hole by passing an electric current through a zone adjacent said sensitive face of the instrument, measuring the electrical resistivity between a plurality of spaced electrodes positioned along said sensitive face of the instrument, said electrodes being separated by a distance that does not exceed the vertical dimension of said zone in order to detect minor variations in the configuration of the formation defining the side of the bore hole adjacent said sensitive face of the instrument, recording a signal proportional to the detected radiation in correlation with the depth of the instrument in the bore hole, and recording a signal proportional to the electrical resistivity between said positions as an indication of the configuration of the formation adjacent said sensitive face of the instrument in correlation with the depth of the instrument in the bore hole.

3. A radioactivity logging instrument suitable for determining the nature of earth formations traversed by a bore hole comprising an elongated instrument housing having mounted thereto a source of penetrative radiation, said housing including in its body portion a detector of secondary radiation spaced from said source along the longitudinal axis of the instrument, the effective sensitive length of said detector being a minor fraction of the total length of said instrument along its major axis, resilient decentralizing means for continually urging an elongated side of the instrument against one side of the bore hole, a caliper system including a plurality of electrodes for measuring the electrical resistivity in a zone adjacent the side of said instrument remote from the decentralizing means, thereby to provide means for deriving an electric signal proportional to minor variations in the configuration of the formation defining the side of the bore hole adjacent the side of the instrument that is urged against it.

4. A radioactivity logging instrument suitable for determining the nature of earth formations traversed by a bore hole comprising an elongated instrument housing having mounted thereto a source of penetrative radiation, said housing including in its body position a detector of secondary radiation spaced from said source along the longitudinal axis of the instrument, the effective sensitive length of said detector along the longitudinal axis of said instrument being a minor fraction of the total length of said instrument along its major axis, resilient decentralizing means for continually urging an elongated side of the instrument against one side of the bore hole, a caliper system for measuring the electrical resistivity in a zone adjacent the side of said instrument remote from the decentralizing means, thereby to provide means for deriving an electric signal proportional to minor variations in the configuration of the formation defining the side of the bore hole adjacent the side of the instrument that is urged against it, said caliper system including means for passing an electric current through said zone and a plurality of spaced electrodes in said zone separated by a distance that does not exceed said effective sensitive length of the detector.

5. A radioactivity logging instrument suitable for determining the nature of earth formations traversed by a bore hole comprising an elongated housing having mounted thereto a source of penetrative radiation and a detector of secondary radiation spaced from one another along the longitudinal axis of the instrument, the effective sensitive length of said detector along the longitudinal axis of said instrument being a minor fraction of the total length of said instrument along its major axis, resilient decentralizing means for continually urging an elongated side of the instrument against one side of the bore hole, a caliper system for measuring the electrical resistivity in a zone adjacent the side of said instrument remote from the decentralizing means, thereby to provide means for deriving an electrical signal proportional to minor variations in the configuration of the formation defining the side of the bore hole adjacent the side of the instrument that is urged against it, said caliper system including means for passing an electric current through said zone, a pair of closely spaced electrodes in said zone primarily sensitive to the resistivity of bore hole fluid and a pair of relatively longer spaced electrodes bridging a gap including said zone whereby said longer spaced electrodes are primarily sensitive to the resistivity of an earth formation adjacent said zone.

6. A radioactivity logging instrument suitable for determining the nature of earth formations traversed by a bore hole comprising an elongated housing carrying means for making a penetrative radiation log primarily indicative of a characteristic of the composition of the earth formations by a source of penetrative radiation and a detector of secondary radiation spaced from one another along the longitudinal axis of the instrument, resilient decentralizing means for continually urging an elongated side of the instrument against one wall of the bore hole, a caliper system comprising means for deriving a signal proportional to the electrical resistivity of the bore hole material between the side of the instrument that is urged against the formation and the formation defining the wall of the bore hole, thereby to provide means for deriving an electrical signal proportional to minor variations in the configuration of the formation defining the wall of the bore hole against which the instrument is urged.

7. A radioactivity logging instrument suitable for determining the nature of earth formations traversed by a bore hole comprising an elongated housing carrying a source of penetrative radiation and a detector of secondary radiation spaced from one another along the longitudinal axis of the instrument, resilient decentralizing means for continually urging an elongated side of the instrument against one wall of the bore hole, a caliper system for measuring minor variations in the configuration of the formation defining the wall of the bore hole adjacent the side of the instrument that is urged against it, said caliper system including first means primarily sensitive to the resistivity of the bore hole fluid and second means primarily sensitive to the resistivity of the adjacent earth formation.

8. Apparatus according to claim 7 wherein said first means comprises a pair of relatively closely spaced button electrodes located on the side of the instrument that is ured against the bore hole wall and wherein said second means comprises a pair of relatively longer spaced ring type electrodes encircling the elongated instrument.

9. A logging instrument according to claim 6 further characterized by the provision of overall caliper means for sensing major variations in the size of the bore hole.

References Cited in the file of this patent

UNITED STATES PATENTS

| | | |
|---|---|---|
| 2,369,672 | Hare | Feb. 20, 1945 |
| 2,436,563 | Frosch | Feb. 24, 1948 |
| 2,648,778 | Silverman et al. | Apr. 11, 1953 |
| 2,659,046 | Arps | Nov. 10, 1953 |
| 2,669,689 | Doll | Feb. 16, 1954 |
| 2,778,950 | Frey et al. | Jan. 22, 1957 |
| 2,778,951 | Tittman | Jan. 22, 1957 |